Patented Nov. 28, 1933                                              1,936,711

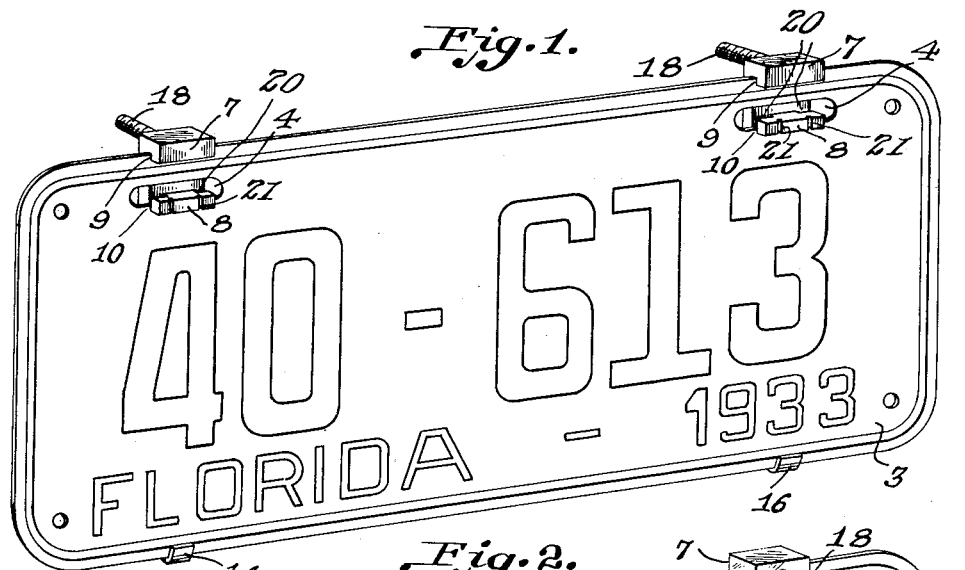
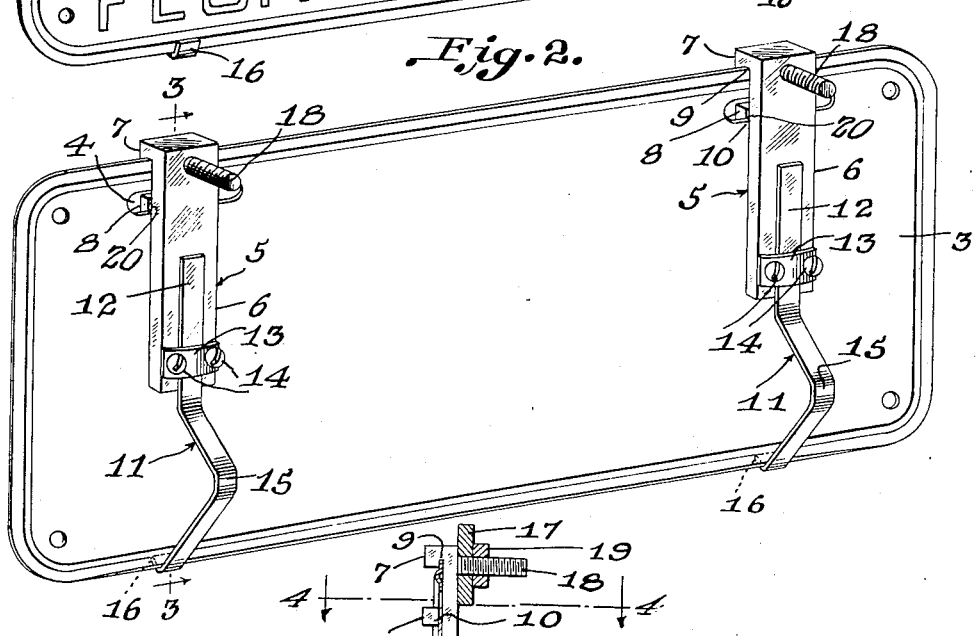
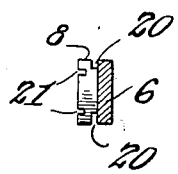
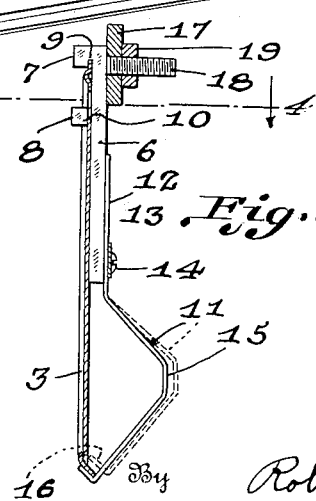

UNITED STATES PATENT OFFICE 1,936,711

LICENSE PLATE HOLDER

Howard F. Doughty, Coral Gables, Fla.

Application March 15, 1933. Serial No. 660,925

5 Claims. (Cl. 40—125)

This invention relates to improvements in automobile license plate holders, and more particularly to license plate holding means which may be used from year to year, and which will accommodate license plates of various sizes without the necessity of loosening nuts or bolts which become rusted during the use of an automobile.

The primary object of the invention is to provide a simple inexpensive holding means by the use of which a license plate may be readily attached to an automobile or removed therefrom, and yet be so constructed as to prevent mischievous children and the like from detaching the plate.

Another object is to furnish license plate holding means including resilient arms designed to grasp one edge of the plate to resiliently hold the opposite end portion of the plate in contact with fixed abutments, whereby the plate is prevented from rattling when the car is in use.

With the foregoing objects outlined and with other objects in view which will appear as the description proceeds, the invention consists in the novel features hereinafter described in detail, illustrated in the accompanying drawing, and more particularly pointed out in the appended claims.

In the drawing,

Fig. 1 is a front perspective view of a license plate with a pair of my improved holders attached thereto.

Fig. 2 is a rear perspective view of the same.

Fig. 3 is a vertical sectional view taken on the line 3—3 of Fig. 2, and showing one of the holders attached to a supporting bar forming part of a license plate bracket of an automobile.

Fig. 4 is a sectional view of a detail of a metal bar which forms part of the holder and which is taken on the line 4—4 of Fig. 3.

Referring to the drawing, 3 designates a conventional license plate having the usual horizontal slots 4 near its upper edge.

For securing such a plate to an automobile or the like, I have devised holders 5, a pair of which may be used with each plate. Each holder consists of a rigid vertical metal bar 6 having a pair of lugs 7 and 8. These lugs both project horizontally, and the upper one forms a groove 9 to receive the upper edge of the license plate. The other or lower lug 8 also forms a groove or notch 10 designed to receive the lower edge portion of one of the slots 4.

The lugs are held in engagement with the plate by means of a resilient arm 11. Such arm consists of a vertical upper end portion 12 which may be adjusted along the bar 6 and is held in any desired position by a short metal strap 13 that is secured to the bar by any suitable means, such as screws 14.

The resilient arm also has a yoke-shaped portion 15 which terminates at its lower end in a hook 16 that snaps over the lower edge of the license plate.

Any suitable means may be employed to secure the holders to the license plate bracket bar 17 of an automobile or the like. For example, each holder may have a bolt 18 rigidly connected to the upper end portion of the holder and adapted to be passed through an aperture in the bar 17, and to be secured to the latter by a nut 19.

When a pair of the holders are secured to the bar 17, it will be obvious that a license plate may be secured in position by simply placing the slotted portions of the license plate over the lugs 8, and then slightly elevating the plate so that portions of the same enter the notches 9 and 10. Then the yoke-shaped portions 15 of the resilient arms can be simply squeezed toward the plate until the hooks 16 snap on to the lower edge of the plate.

From this time on the plate will be resiliently held in position, and whenever it is desired to remove the plate, this can be readily accomplished by simply moving the hooks 16 off the lower edges of the plate, so that the plate will drop downwardly out of the notches. Then the plate can be slipped off the lugs 8.

As the slots 4 in some license plates are shorter than others, I prefer to make each of the lugs 8 in such a way that its ends may be readily broken off. For example, the end portions of each lug 8 may be provided with vertical notches 20, and forwardly of these notches the lug can be provided with one or more vertical slits 20. Obviously such construction will permit the ends of the lug to be readily broken off.

From the foregoing it is believed that the construction and advantages of the invention may be readily understood, and it is apparent that changes may be made in the details disclosed, without departing from the spirit of the invention, as expressed in the claims.

What I claim and desire to secure by Letters Patent is:

1. A license plate holder including a bar adapted to be attached to a license plate bracket or the like and provided with a pair of projecting lugs disposed adjacent one end of said bar and in vertical alignment with each other, one of which is adapted to extend through a slot in a license plate, said lugs being notched to receive portions of the plate, and resilient means secured to the bar and provided with a hook engageable with an edge of said license plate.

2. A license plate holder including a bar adapted to be attached to a license plate bracket or the like and provided with projecting lugs, one of which is adapted to extend through a slot in a license plate, said lugs being notched to receive portions of the plate, and resilient means secured to the bar and provided with a hook engageable with an edge of said license plate, said resilient means being adjustably secured to said bar.

3. A license plate holder including a bar adapted to be attached to a license plate bracket or the like and provided with projecting lugs, one of which is adapted to extend through a slot in a license plate, said lugs being notched to receive portions of the plate, and resilient means secured to the bar and provided with a hook engageable with an edge of said license plate, said resilient means comprising a strap metal arm having its upper end portion connected to the bar and provided with a yoke-shaped portion between its upper end portion and said hook.

4. A license plate holder comprising a vertical bar provided with a pair of forwardly projecting lugs, each of said lugs having a notch in its under side, means projecting from the rear surface of the bar for securing the latter to a license plate bracket, a resilient strap metal arm having an intermediate yoke-shaped portion, a hook at its lower end, and an upwardly extending vertical portion, said last mentioned portion being adjustable along said bar, and means for adjustably securing the last mentioned portion to said bar.

5. A license plate holder including a bar adapted to be attached to a license plate bracket or the like and provided with projecting lugs, one of which is adapted to extend through a slot in the license plate, said last mentioned lug having its ends notched and slitted to facilitate the breaking off of the ends of that lug to accommodate a shorter slot, both of said lugs being grooved to receive portions of the plate, and means secured to the bar and engageable with an edge of the plate for maintaining the bar in connection with a license plate.

HOWARD F. DOUGHTY.